(12) United States Patent
Poisner

(10) Patent No.: US 6,820,177 B2
(45) Date of Patent: Nov. 16, 2004

(54) PROTECTED CONFIGURATION SPACE IN A PROTECTED ENVIRONMENT

(75) Inventor: David I. Poisner, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 10/167,434

(22) Filed: Jun. 12, 2002

(65) Prior Publication Data

US 2003/0233524 A1 Dec. 18, 2003

(51) Int. Cl.[7] .............................................. G06F 12/00
(52) U.S. Cl. ........................ 711/152; 711/163; 710/200
(58) Field of Search ................................ 711/202, 156, 711/152, 163; 710/200, 240; 713/200

(56) References Cited

U.S. PATENT DOCUMENTS

| 3,699,532 A | * 10/1972 | Schaffer et al. ................ 710/48 |
| 3,996,449 A | 12/1976 | Attanasio et al. |
| 4,037,214 A | 7/1977 | Birney et al. |
| 4,162,536 A | 7/1979 | Morley |
| 4,247,905 A | 1/1981 | Yoshida et al. |
| 4,276,594 A | 6/1981 | Morley |
| 4,278,837 A | 7/1981 | Best |
| 4,307,214 A | 12/1981 | McDaniel et al. |
| 4,307,447 A | 12/1981 | Provanzano et al. |
| 4,319,323 A | 3/1982 | Ermolovich et al. |
| 4,347,565 A | 8/1982 | Kaneda et al. |
| 4,366,537 A | 12/1982 | Heller et al. |
| 4,430,709 A | 2/1984 | Schleupen |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |

(List continued on next page.)

FOREIGN PATENT DOCUMENTS

| EP | 0600112 A1 | 8/1994 |
| EP | 0930567 A3 | 7/1999 |
| EP | 0961193 | 12/1999 |

(List continued on next page.)

OTHER PUBLICATIONS

Heinrich, J., "MIPS R4000 Microprocessor User's Manual," 1994, MIPS Technology, Inc., Mountain View, CA, pp. 67–79.

Heinrich, J. "MIPS R4000 Microprocessor User's Manual," Apr. 1, 1993, MIPS, Mt. View, XP002184449, pp. 61–97.

"M68040 User's Manual," 1993, Motorola, Inc., Chapters 1–8, including, pp. 1–5, 1–9, 1–13, 1–20, 2–1, 2–3, 4–1, 8–9 and 8–11.

(List continued on next page.)

*Primary Examiner*—Nasser Moazzami
(74) *Attorney, Agent, or Firm*—Blakley, Sokoloff, Taylor & Zafman LLP

(57) ABSTRACT

A protected configuration space is implemented as at least one range of memory addresses that are mapped to logic external to system memory. The memory addresses access logic that performs control and status operations pertaining to a protected operating environment. Some of the addresses may access protected configuration registers. Commands having destination addresses within the protected configuration space may not be completed if the commands are not issued by a processor, or if the commands are not part of a group of one or more designated protected commands. A separately addressable non-protected configuration space may also be implemented, accessible by processors, non-processors and/or non-protected commands.

7 Claims, 4 Drawing Sheets

U.S. PATENT DOCUMENTS

| | | | |
|---|---|---|---|
| 5,187,802 A | | 2/1993 | Inoue et al. |
| 5,230,069 A | | 7/1993 | Brelsford et al. |
| 5,237,616 A | * | 8/1993 | Abraham et al. ........... 713/193 |
| 5,255,379 A | | 10/1993 | Melo |
| 5,293,424 A | | 3/1994 | Holtey et al. |
| 5,295,251 A | | 3/1994 | Wakui et al. |
| 5,317,705 A | | 5/1994 | Gannon et al. |
| 5,319,760 A | | 6/1994 | Mason et al. |
| 5,361,375 A | | 11/1994 | Ogi |
| 5,386,552 A | | 1/1995 | Garney |
| 5,421,006 A | | 5/1995 | Jablon et al. |
| 5,437,033 A | | 7/1995 | Inoue et al. |
| 5,455,909 A | | 10/1995 | Blomgren et al. |
| 5,459,867 A | | 10/1995 | Adams et al. |
| 5,459,869 A | | 10/1995 | Spilo |
| 5,469,557 A | | 11/1995 | Salt et al. |
| 5,473,692 A | | 12/1995 | Davis |
| 5,479,509 A | | 12/1995 | Ugon |
| 5,504,922 A | | 4/1996 | Seki et al. |
| 5,506,975 A | | 4/1996 | Onodera |
| 5,511,217 A | | 4/1996 | Nakajima et al. |
| 5,522,075 A | | 5/1996 | Robinson et al. |
| 5,555,385 A | | 9/1996 | Osisek |
| 5,555,414 A | | 9/1996 | Hough et al. |
| 5,564,040 A | | 10/1996 | Kubala |
| 5,568,552 A | | 10/1996 | Davis |
| 5,574,936 A | | 11/1996 | Ryba et al. |
| 5,582,717 A | | 12/1996 | Di Santo |
| 5,606,617 A | | 2/1997 | Brands |
| 5,615,263 A | | 3/1997 | Takahashi |
| 5,628,022 A | | 5/1997 | Ueno et al. |
| 5,657,445 A | | 8/1997 | Pearce |
| 5,668,971 A | * | 9/1997 | Neufeld ...................... 711/111 |
| 5,684,948 A | * | 11/1997 | Johnson et al. ............. 713/200 |
| 5,706,469 A | * | 1/1998 | Kobayashi .................. 710/240 |
| 5,717,903 A | | 2/1998 | Bonola |
| 5,729,760 A | | 3/1998 | Poisner |
| 5,737,604 A | | 4/1998 | Miller et al. |
| 5,737,760 A | | 4/1998 | Grimmer, Jr. et al. |
| 5,757,919 A | | 5/1998 | Herbert et al. |
| 5,764,969 A | | 6/1998 | Kahle et al. |
| 5,796,845 A | | 8/1998 | Serikawa et al. |
| 5,805,712 A | | 9/1998 | Davis |
| 5,835,594 A | | 11/1998 | Albrecht et al. |
| 5,844,986 A | | 12/1998 | Davis |
| 5,852,717 A | | 12/1998 | Bhide et al. |
| 5,854,913 A | | 12/1998 | Goetz et al. |
| 5,872,994 A | | 2/1999 | Akiyama et al. |
| 5,890,189 A | | 3/1999 | Nozue et al. |
| 5,901,225 A | | 5/1999 | Ireton et al. |
| 5,937,063 A | | 8/1999 | Davis |
| 5,953,502 A | | 9/1999 | Helbig, Sr. |
| 5,956,408 A | | 9/1999 | Arnold |
| 5,970,147 A | | 10/1999 | Davis |
| 5,978,475 A | | 11/1999 | Schneier et al. |
| 5,978,481 A | | 11/1999 | Ganesan et al. |
| 5,987,557 A | | 11/1999 | Ebrahim |
| 6,014,745 A | | 1/2000 | Ashe |
| 6,044,478 A | | 3/2000 | Green |
| 6,055,637 A | | 4/2000 | Hudson et al. |
| 6,058,478 A | | 5/2000 | Davis |
| 6,061,794 A | | 5/2000 | Angelo |
| 6,075,938 A | | 6/2000 | Bugnion et al. |
| 6,085,296 A | | 7/2000 | Karkhanis et al. |
| 6,088,262 A | | 7/2000 | Nasu |
| 6,092,095 A | | 7/2000 | Maytal |
| 6,101,584 A | | 8/2000 | Satou et al. |
| 6,115,816 A | | 9/2000 | Davis |
| 6,125,430 A | | 9/2000 | Noel et al. |
| 6,148,379 A | | 11/2000 | Schimmel |
| 6,158,546 A | | 12/2000 | Hanson et al. |
| 6,173,417 B1 | | 1/2001 | Merrill |
| 6,175,924 B1 | | 1/2001 | Arnold |
| 6,175,925 B1 | | 1/2001 | Nardone et al. |
| 6,178,509 B1 | | 1/2001 | Nardone et al. |
| 6,182,089 B1 | | 1/2001 | Ganapathy et al. |
| 6,188,257 B1 | | 2/2001 | Buer |
| 6,192,455 B1 | | 2/2001 | Bogin et al. |
| 6,205,550 B1 | | 3/2001 | Nardone et al. |
| 6,212,635 B1 | | 4/2001 | Reardon |
| 6,222,923 B1 | | 4/2001 | Schwenk |
| 6,249,872 B1 | | 6/2001 | Wildgrube et al. |
| 6,252,650 B1 | | 6/2001 | Nakamura |
| 6,269,392 B1 | | 7/2001 | Cotichini et al. |
| 6,272,533 B1 | | 8/2001 | Browne |
| 6,272,637 B1 | | 8/2001 | Little et al. |
| 6,275,933 B1 | | 8/2001 | Fine et al. |
| 6,282,650 B1 | | 8/2001 | Davis |
| 6,282,651 B1 | | 8/2001 | Ashe |
| 6,282,657 B1 | | 8/2001 | Kaplan et al. |
| 6,292,874 B1 | | 9/2001 | Barnett |
| 6,301,646 B1 | | 10/2001 | Hostetter |
| 6,314,409 B2 | | 11/2001 | Schneck et al. |
| 6,321,314 B1 | | 11/2001 | Van Dyke |
| 6,330,670 B1 | | 12/2001 | England et al. |
| 6,339,815 B1 | | 1/2002 | Feng et al. |
| 6,339,816 B1 | | 1/2002 | Bausch |
| 6,357,004 B1 | | 3/2002 | Davis |
| 6,363,485 B1 | | 3/2002 | Adams et al. |
| 6,374,286 B1 | | 4/2002 | Gee et al. |
| 6,374,317 B1 | | 4/2002 | Ajanovic et al. |
| 6,378,068 B1 | | 4/2002 | Foster |
| 6,378,072 B1 | | 4/2002 | Collins et al. |
| 6,389,537 B1 | | 5/2002 | Davis et al. |
| 6,397,242 B1 | | 5/2002 | Devine et al. |
| 6,412,035 B1 | | 6/2002 | Webber |
| 6,421,702 B1 | | 7/2002 | Gulick |
| 6,445,797 B1 | | 9/2002 | McGough |
| 6,463,535 B1 | | 10/2002 | Drews |
| 6,463,537 B1 | | 10/2002 | Tello |
| 6,499,123 B1 | | 12/2002 | McFarland et al. |
| 6,505,279 B1 | | 1/2003 | Phillips et al. |
| 6,507,904 B1 | | 1/2003 | Ellison et al. |
| 6,535,988 B1 | | 3/2003 | Poisner |
| 6,557,104 B2 | | 4/2003 | Vu et al. |
| 6,633,963 B1 | | 10/2003 | Ellison et al. |
| 6,633,981 B1 | | 10/2003 | Davis |
| 2001/0021969 A1 | | 9/2001 | Burger et al. |
| 2001/0027527 A1 | | 10/2001 | Khidekel et al. |
| 2001/0037450 A1 | | 11/2001 | Metlitski et al. |
| 2003/0018892 A1 | | 1/2003 | Tello |

FOREIGN PATENT DOCUMENTS

| | | |
|---|---|---|
| EP | 0965902 | 12/1999 |
| EP | 1 030 237 A1 | 8/2000 |
| EP | 1085396 | 3/2001 |
| EP | 1146715 A1 | 10/2001 |
| EP | 1271277 | 1/2003 |
| JP | 02000076139 A | 3/2000 |
| WO | WO9524696 | 9/1995 |
| WO | WO 97/29567 | 8/1997 |
| WO | WO 98/34365 | 8/1998 |
| WO | WO 98/44402 | 10/1998 |
| WO | WO 99/05600 | 2/1999 |
| WO | WO 99/09482 | 2/1999 |
| WO | WO 99/57863 | 11/1999 |
| WO | WO99/65579 | 12/1999 |
| WO | WO0021238 | 4/2000 |
| WO | WO 00/62232 | 10/2000 |
| WO | WO 01/27723 A | 4/2001 |
| WO | WO 01/27821 A | 4/2001 |

| | | |
|---|---|---|
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO 02 17555 A | 2/2002 |
| WO | WO 02 086684 A | 10/2002 |

OTHER PUBLICATIONS

"Intel 386 DX Microprocessor 32–Bit CHMOS Microprocessor With Integrated Memory Management," Dec. 31, 1995, Intel, Inc., pp. 1–56, including pp. 32–56; and figure 4–14.

Berg, C., "How do I Create a Signed Applet?," Dr. Dobb's Journal, M&T Publ., Redwood City, CA, US, vol 22, No. 8, 8/97, pp. 1–9.

Gong, L., et al., "Going Beyond the Sandbox: An Overview of the New Security Architecture in the JAVA Development Kit 1.2," Proceedings of the Usenix Symposium on the Internet Technologies and Systems, Monterrey, CA 12/97, pp. 103–112.

Goldberg, R., "Survey of virtual machine research," IEEE Computer Magazine 7(6), pp. 34–45, 1974.

Gum, P.H., "System/370 Extended Architechture: Facilities for Virtual Machines," IBM J. Research Development, vol. 27, No. 6, pp. 530–544, Nov. 1983.

Rosenblum, M. "Vmware's Virtual Platform: A Virtual Machine Monitor for Commodity PCs," Proceedings of the 11th Hotchips Conference, pp. 185–196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1–31.

"Trust Computing Platform Alliance (TCPA)," Main Specification Version 1.1a, Compaq Computer Corporation, Hewlett–Packard Company, IBM Corporation, Intel Corporation, Microsoft Corporation, Dec. 2001.

"Information Display Technique for a Terminate Stay Resident Program," IBM Technical Disclosure Bulletin, TDB–ACC–No. NA9112156, Dec. 1, 1991, pp. 156–158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1–17, XP002247347, Denver, CO.

Karger, Paul A., et al., "A VMM Security Kernel for the VAX Architechture," Proceedings of the Symposium on Research in Security and Privacy, May 7, 1990, pp. 2–19, XP010020182, ISBN: 0–8186–2060–9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209–221, XP010359180, ISBN: 0–7695–0375–6, Los Alamitos, CA.

* cited by examiner

GENERAL MAPPING OF PROTECTED CONFIGURATION SPACE

| Allocation | Offset Ranges | Description |
|---|---|---|
| General Registers | 0000 - 00FF | General purpose operations not specific to any one functional block. |
| Processor Bus I/F | 0100 - 01FF | Operations specific to the processor bus interface |
| Memory I/F | 0200 - 02FF | Operations specific to the memory interface |
| Reserved | 0300 - 03FF | Reserved for unspecified future use. |
| Cryptographic Key | 0400 - 06FF | Contains a cryptographic key. |
| Reserved | 0700 - 07FF | Reserved for unspecified future use. |
| Token I/F | 0800 - 08FF | Operations specific to the token and extended error status information. |
| Token Registers | 0900 - 09FF | Datapath registers to transfer data between the processors and the token. |
| Reserved | 0A00 - 0CFF | Reserved for unspecified future use. |
| Processor-to Logic Circuit | 0D00 - 0DFF | Event messages between the processors and the logic circuit. |
| Inter-Processor Event Messages | 0E00 - 0EFF | Event messages that a processor sends to other processors. |
| Reserved | 0F00 - 0FFF | Reserved for future use specific to the logic circuit. |

FIG. 2

PROTECTED CONFIGURATION SPACE IN A PROTECTED ENVIRONMENT

BACKGROUND

Although a great deal of effort has been devoted to providing security protection for transmissions between computer systems over networks, the computer systems themselves are still comparatively unprotected. The existing code in these systems may be in the form of user applications, BIOS routines, operating system routines, etc., which are vulnerable to corruption by viruses and other third party software. Such corruption, which is typically deliberate, may simply interfere with the normal operation of the system, may destroy files and other important data, and/or may be used to surreptitiously gain access to classified information. Various measures have been developed to reduce the threat of such harm, but most rely solely on security software in the form of detection software that searches for known viruses, validation software that validates the integrity of software modules before they are executed, and monitoring software that detects a limited number of abnormal events in the execution of software modules. To provide uniformity across many platforms, most security software is relatively independent of the hardware on which it is running and therefore cannot use hardware features to increase the level of protection. Thus, the level of protection may be completely dependent on the security software. However, the security software itself is subject to software attack, and thus provides only limited protection.

BRIEF DESCRIPTION OF THE DRAWINGS

The invention may be understood by referring to the following description and accompanying drawings that are used to illustrate embodiments of the invention. In the drawings:

FIG. 2 shows a mapping of protected configuration space to protected operations, according to one embodiment of the invention.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Embodiments of the invention may be implemented in one or a combination of hardware, firmware, and software. Embodiments of the invention may also be implemented as instructions stored on a machine-readable medium, which may be read and executed by at least one processing device to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Various embodiments of the invention may provide security features in a computer system by having a protected configuration space that is used to control and/or monitor operations in a protected operating environment. As used herein, the term "protected configuration space" refers to one or more designated ranges of addresses that, when received as a destination address in a bus command, redirect the command to protected configuration hardware external to memory. The protected configuration hardware holds control values, provides control information, and performs operations that are accessible only to protected commands. As used herein, the term "protected commands" refers to commands that have a destination address within the protected configuration space and that are intended to be issued only by processors within the protected operating environment. Non-protected commands that have a destination address within the protected configuration space may be rejected rather than accepted, where "accepted" indicates the commands will be executed as intended and "rejected" indicates the commands will not be executed as intended.

Figure 1:
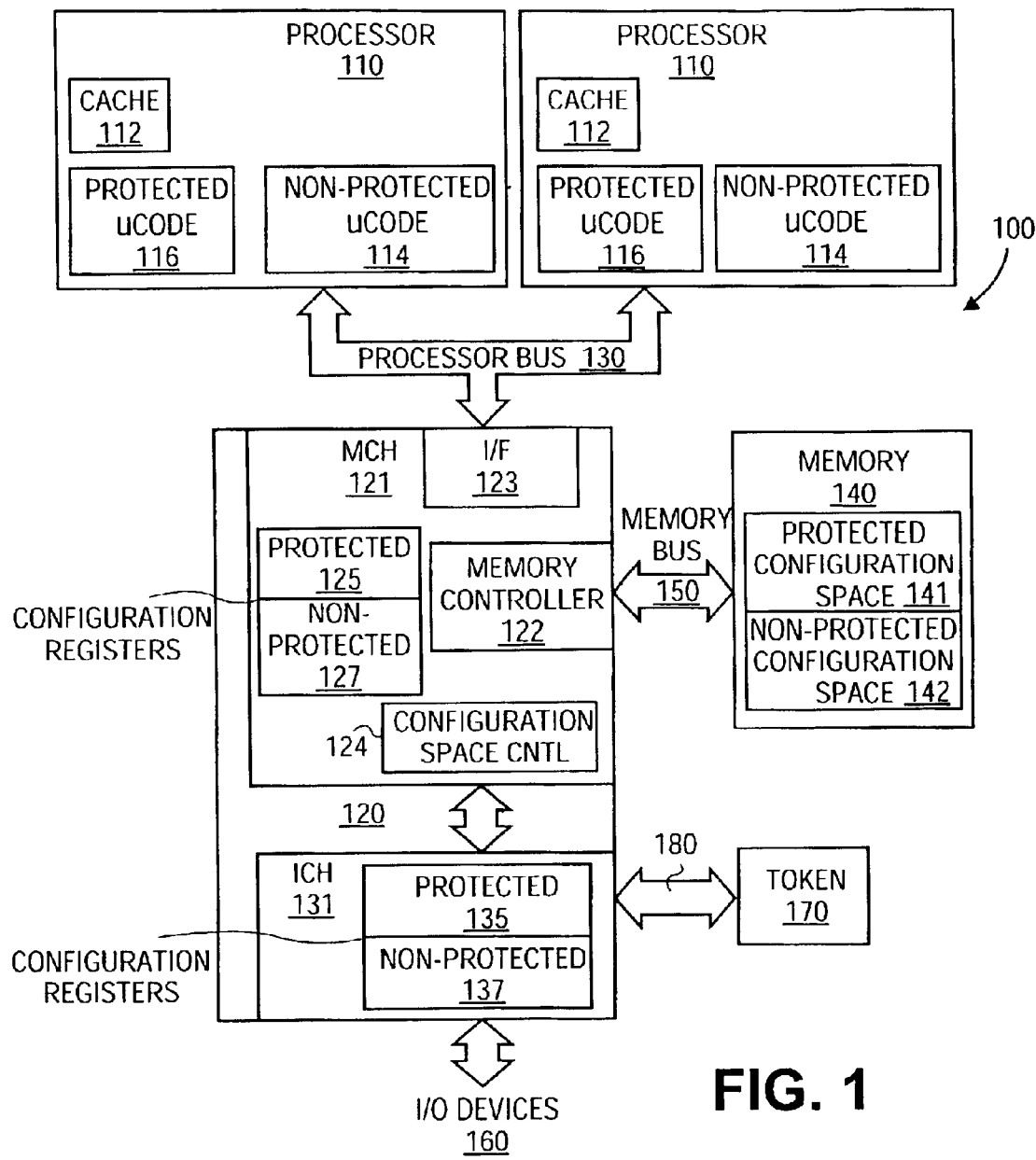
FIG. 1 shows a block diagram of a system, according to one embodiment of the invention.

FIG. 1 shows a block diagram of a system, according to one embodiment of the invention. Although FIG. 1 shows a particular configuration of system components, various embodiments of the invention may use other configurations. The illustrated system 100 includes one or more computing devices in the form of one or more processors 110 (two are shown in the illustrated embodiment, but one, three, or more may be used), a memory 140, a logic circuit 120 coupled to the memory 140 through memory bus 150 and coupled to the processor(s) 110 through processor bus 130, and a token 170 coupled to the logic circuit 120 over bus 180. Each processor 110 may include various elements, including any or all of: 1) cache memory 112, 2) non-protected microcode (uCode) 114, and 3) protected microcode 116. Microcode includes circuitry to generate operations and micro-operations in the execution of instructions, where instructions may include both program (software-implementable) operations and operations triggered by hardware events that may not be directly programmable. Protected microcode 116 includes microcode that may be executed only by protected instructions and/or as part of a protected operation. Non-protected microcode may be executed outside those restrictions. Microcode that initiates a command over processor bus 130 may identify the command as a protected command in various ways, including but not limited to: 1) asserting one or more particular control lines on the bus, 2) placing a predetermined identifier on the bus, 3) placing predetermined data on the data lines, 4) placing a predetermined address on the address lines, 5) asserting certain signals with timing that is unique to protected commands, 6) etc. While in one embodiment the protected microcode 116 is co-resident with the non-protected microcode 114, in another embodiment the protected microcode 116 is physically and/or logically separate from the non-protected microcode 114.

Memory 140 may include all of main memory. However, some of the potential address space that would potentially be accessed in memory 140 may be reserved for other purposes, and accesses to those reserved addresses may be redirected to other parts of the system. Configuration space may be reserved in this manner. Configuration "space" is a conceptual term that refers to the range(s) of addresses that are reserved for implementation in logic circuit 120 for various activities, with accesses that are targeted to any address within the configuration space being redirected to various portions of logic circuit 120 rather than to memory 140 or to input-output devices. FIG. 1 shows protected configuration space 141 and non-protected configuration space 142, which represent the ranges of addressable locations that are reserved for control and monitoring activities (protected and non-protected activities, respectively) that are implemented in logic circuit 120. Configuration space may be implemented with addresses that would otherwise be part of memory address space or input-output (I/O) address space. Read or write commands to at least a portion of the addresses in the configuration space are redirected to configuration registers in logic circuit 120. In some embodiments, another portion of the addresses in the configuration space are used for commands that trigger some type of action within the logic circuit 120 rather than being used to store data in, or read data from, a register. In still another embodiment, commands directed to specific addresses in the configuration space may be temporarily placed in registers before being passed on to circuits external to logic circuit 120 (e.g., to token 170 over bus 180).

While in one embodiment one or both of protected configuration space 141 and non-protected configuration space 142 contain only contiguous addresses, in another embodiment the addresses are not all contiguous. As used herein, the term "contiguous" may refer to contiguous in physical memory space or contiguous in virtual memory space.

Logic circuit 120 may include various components, such as but not limited to: interface (I/F) 123 to decode the destination address of any command received over processor bus 130, memory controller 122 to control operations over memory bus 150, configuration registers 125, 127, 135, and 137, and configuration space control logic 124 to control operations within logic circuit 120. In one embodiment logic circuit 120 includes memory control hub (MCH) 121 and I/O control hub (ICH) 131, which may be implemented as separate integrated circuits. In an alternate embodiment, logic circuit 120 may be organized differently than shown in FIG. 1, and may be implemented within one or more integrated circuits in any feasible manner.

In one embodiment, I/F 123 may receive the commands seen on processor bus 130 and decode the destination addresses to determine how to respond. Configuration space control logic 124 may be used to convert some decoded addresses into the appropriate response. Such response may include, but is not limited to:

1) in response to the address being directed to another device on processor bus 130, ignore the command, 2) in response to the address being directed to a viable location in memory 140, initiate the indicated read or write operation to memory 140 over memory bus 150, 3) in response to the address being directed to one of I/O devices 160, pass the command along to the I/O device over the appropriate bus, 4) in response to the address being directed to configuration space, determine which of the following actions is associated with that particular address and perform that action: a) perform the indicated read or write operation on the configuration register specified by the address, b) initiate a non-read/write action within logic circuit 120, c) send a read, write, or other command to token 170 over bus 180 (in one embodiment, token 170 contains protected information associated with various cryptographic and/or validation processes), d) abort the command if the command indicates an operation that is not permitted. Such impermissible operations may include but are not limited to: performing a non-protected operation in protected configuration space, performing a protected operation that is currently restricted, and performing a protected operation in an impermissible format. Aborting a command may take various forms, including but not limited to: timing out without responding, responding with an error code, responding with meaningless data (e.g., all 0's or all 1's), exiting the protected operational environment, and performing a system reset.

In one embodiment, the configuration registers include protected configuration registers 125, 135 and non-protected configuration registers 127, 137. Protected configuration registers may be used to control and monitor protected operations, and may be inaccessible to non-protected software and/or hardware, while non-protected configuration registers may be used for non-protected operations and may be accessible to non-protected hardware and/or software. In one embodiment, protected configuration registers may be implemented in physical registers that are physically and permanently distinct from non-protected registers. In another embodiment, one or more physical registers may be programmably designated as protected or non-protected at different times. In still another embodiment, one or more physical registers may be designated as both protected and non-protected, and be accessible by both protected and non-protected operations through different addresses.

In a particular embodiment, some configuration registers may be physically implemented in MCH 121 (e.g., configuration registers 125, 127 in FIG. 1), while other configuration registers may be physically implemented in ICH 131 (e.g., configuration registers 135, 137 in FIG. 1). Each group may include both protected (e.g., 125, 135) and non-protected (e.g., 127, 137) configuration registers. In such an embodiment, MCH 121 may pass on to ICH 131 any command directed to an address in configuration registers 135, 137 or that is otherwise implementable through ICH 131.

In one embodiment, logic circuit 120 may have a fuse, or its circuit equivalent, that may be blown at manufacturing time and is inaccessible after manufacturing, to disable (or alternately to enable) the operation of some or all of the protected configuration space, so that a single integrated circuit may be manufactured for both protected and non-protected applications, with the choice being a simple manufacturing operation rather than a circuit change.

In one embodiment, the configuration space is accessible only by processors 110, so that no other bus masters, I/O devices, or other internal devices are permitted to access the configuration space. Attempted commands to the configuration space by non-permitted devices may be handled in various ways, including but not limited to: 1) ignore the command, 2) return a default value such as all 0's or all 1's in response to a read command, 3) return an error code, 4) generate a system interrupt, and 5) generate a system reset.

Non-protected configuration space may be accessed by commands initiated from non-protected microcode 114. In one embodiment, protected configuration space may be accessed in either of two ways: 1) By issuing certain designated commands implemented through protected microcode 116. Commands issued to protected configuration space from non-protected microcode 114 will not succeed. 2) By issuing a command from protected microcode 116 that opens the protected configuration space to access by commands from non-protected microcode 114 and then executing the commands from non-protected microcode 114. A separate command from protected microcode 116 may close the protected configuration space to further access by commands from non-protected microcode 114.

In some embodiments, specific ones of protected configuration registers 125, 127 may be further restricted from access. Such restrictions may include, but are not limited to: 1) permitting read access but not write access by one or more particular processors 110, 2) restricting both read and write access by one or more particular processors 110, and 3) restricting modification of certain bits of the register.

In one embodiment, processors 110 may be prevented from caching any addresses within the protected configuration space 141. In another embodiment, processors 110 may be prevented from caching any addresses within both the protected configuration space 141 and the non-protected configuration space 142.

Each valid address within the configuration space 141, 142 may be mapped to various circuits, including but not limited to one or more of 1) a particular configuration register, 2) the logic to perform the associated internal action, and 3) another bus for passing the command on to a device external to logic circuit 120. In one embodiment, multiple addresses may be mapped to the same configuration register, internal action, or external bus. In one embodiment, an address in protected configuration space and an address in non-protected configuration space may be mapped to the same configuration register, internal action, or external bus. In a particular embodiment, one of two addresses that are mapped to the same configuration register may be limited to a read operation, while the other address may not be so restricted.

In some embodiments, the mapping logic is included in configuration space control logic 124. In one embodiment, the mapping used may be hard-wired at the time of manufacture. In another embodiment, the mapping may be programmed into non-volatile memory. In still another embodiment, the mapping may be programmed into volatile memory when the system is initialized and/or when the protected operating environment is initialized.

Protected Configuration Registers

Configuration registers may take various forms and serve various purposes. The following register descriptions apply to protected configuration registers of one particular embodiment, but other embodiments may have more or fewer registers than described, and the registers may have other names and serve other purposes.

ESTS—An error status register, which retains its contents across a system reset as long as power is not removed. The errors to be reported by the error status register may include, but are not limited to: 1) a failed attempt to enter a protected processing environment, 2) an attempted access to configuration space by an unauthorized device, 3) an attempted access to other protected memory by an unauthorized device, and 4) an attempted access that results in other violations of protected configuration space.

CMD—a command register, with individual operations being initiated as a result of specific bits in the command register being set or cleared. Such commands may include but are not limited to: 1) Lock/Unlock the protected configuration space—while locked it may be modified only by specified microcode. 2) Lock/Unlock the memory controller's memory configuration—while locked, designated sections of memory may be accessed only by authorized devices. 3) Memory Wipe—enables hardware clearing of memory following a reset event, so that information that was protected in protected memory before the reset is not inadvertently exposed after the reset. 4) System Reset—forces an immediate system reset. 5) Enable/Disable NoDMA—while enabled, no DMA transfers may be permitted into or out of protected memory, so that protected information may not be accessed by non-protected devices through a DMA transfer. 6) Secrets/No Secrets—No Secrets indicates that any secret information has been scrubbed from protected memory, so that a protected environment may be exited without compromising that secret information.

THREADS.EXIST—A bitmap status register, where each bit indicates an active processor thread in the system. Each bit may correspond to a processor bus command with a new bus agent ID.

THREAD.JOIN—A bitmap status register, where each bit indicates that a specific processor has indicated it is ready to join the protected operating environment, and the bit is cleared when the processor exits the protected operating environment.

DEVMEM—The physical address of the base of a block of physically contiguous memory used as Device Memory. Device Memory may contain a NoDMA table that selectively restricts DMA access to blocks of protected memory, protected interrupt handlers, and other memory images that remain stable and accessible during the protected operating environment.

SINIT.BASE, SINIT.SIZE—The base address and size, respectively, of an Authenticated Code module that may be used to initialize a protected operating environment. These parameters may be used to locate the module so that it may be transferred into a protected memory for validation and execution.

PAGETABLE.BASE, PAGETABLE.SIZE—The base address and size, respectively, of a page table that identifies which pages in main memory are designated as protected memory and are therefore unavailable for non-protected access.

CRYPTO.KEY—Read-only registers or ROM containing a cryptographic key for use in decrypting and/or validating the aforementioned Authenticated Code module.

TOKENPORTS[0:15]—a set of registers (in this case sixteen registers) representing ports to the token 170 that contains encryption and/or validation information for the protected operating environment. These registers may be used as buffer space for transferring that information.

FIG. 2 shows a mapping of protected configuration space to protected operations, according to one embodiment of the invention. Although an embodiment with a specific mapping is shown, other embodiments may use other mappings. The addresses in FIG. 2 are shown in hexadecimal notation, as offsets from a base address. In one embodiment the base address is FED20000, but other embodiments may use other base addresses. In the illustrated embodiment of FIG. 2, the protected configuration space occupies a single block of 65,536 contiguous addresses, but other embodiments may have different sizes and/or be distributed among non-contiguous addresses.

In the illustrated embodiment, the address space is divided into blocks of FF hex (256 decimal) locations, which are allocated to various types of use. The first block (0000–00FF) may be allocated for general registers, e.g., registers that are not clearly dedicated to any of the other listed types of use. The second block (0100–01FF) may be dedicated to operations that are specific to the processor interface (e.g., I/F 123 of FIG. 1). In one embodiment, one or more specific registers may be dedicated to holding information pertaining to one or more specific processors. In a similar manner, the third block (0200–02FF) may be dedicated to operations that are specific to main memory operations (e.g., memory 140 and/or memory controller 122 of FIG. 1).

The fourth, eighth, and eleventh through thirteenth blocks of address space (0300–03FF, 0700–07FF, and 0A00–0CFF, respectively) may be unused, and reserved for unspecified future use. The fifth, sixth, and seventh blocks (0400–06FF) may be used to hold one or more cryptographic keys, which may be used during protected processing for encrypting, decrypting, and/or validating data. In one embodiment, this entire space may be implemented as read-only registers that hold a single embedded key, but other embodiments may implement this space in other ways.

A portion of the ninth block of address space (0800–08FF) may be reserved for operations specific to the use of a token (e.g., token 170 in FIG. 1), while the remainder of the ninth block may be used for extended error status information. The tenth block (0900–09FF) may be used as buffer space to handle data being transferred to and/or from the token. The fourteenth block of address space (0D00–0DFF) may be used for event messages from a processor to the configuration space logic (e.g., one or more of processors 110 to logic circuit 120 in FIG. 1). In one embodiment, an event message is a command that does not read or write data, but that triggers a specific response based on the destination address. In a particular embodiment, the fourteenth block of address space is reachable only from protected processor microcode (e.g., protected microcode 116 of FIG. 1).

The fifteenth block of address space (0E00–0EFF) may be used for event messages between processors. In some embodiments, the event messages may be between threads rather than physical processors. In one embodiment, a physical register may receive and hold an event message from one processor/thread for reading by another processor/thread. In another embodiment, the event message may be communicated directly between processors/threads, and the configuration space may be used to note the event message for its potential effect on logic circuit 120.

The sixteenth block of address space (0F00–0FFF) may be reserved for future use specific to logic circuit 120.

In one embodiment, non-protected configuration space (not shown in FIG. 2) may be located adjacent to protected configuration space, and may have an allocation of addresses different than those shown for protected configuration space.

Figure 3A:
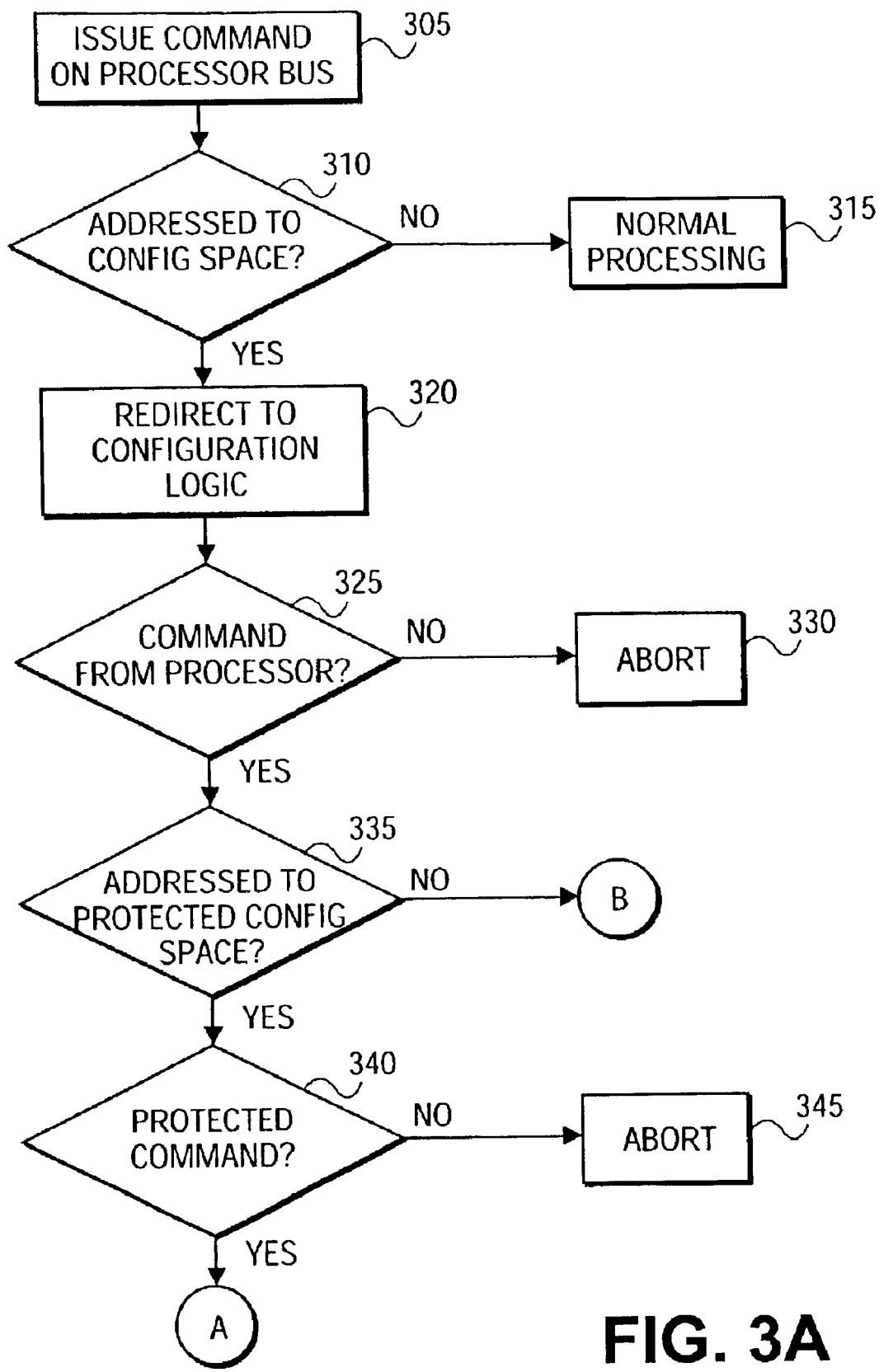
FIGS. 3A–B show a flow chart of a method, according to one embodiment of the invention.
Figure 3B:
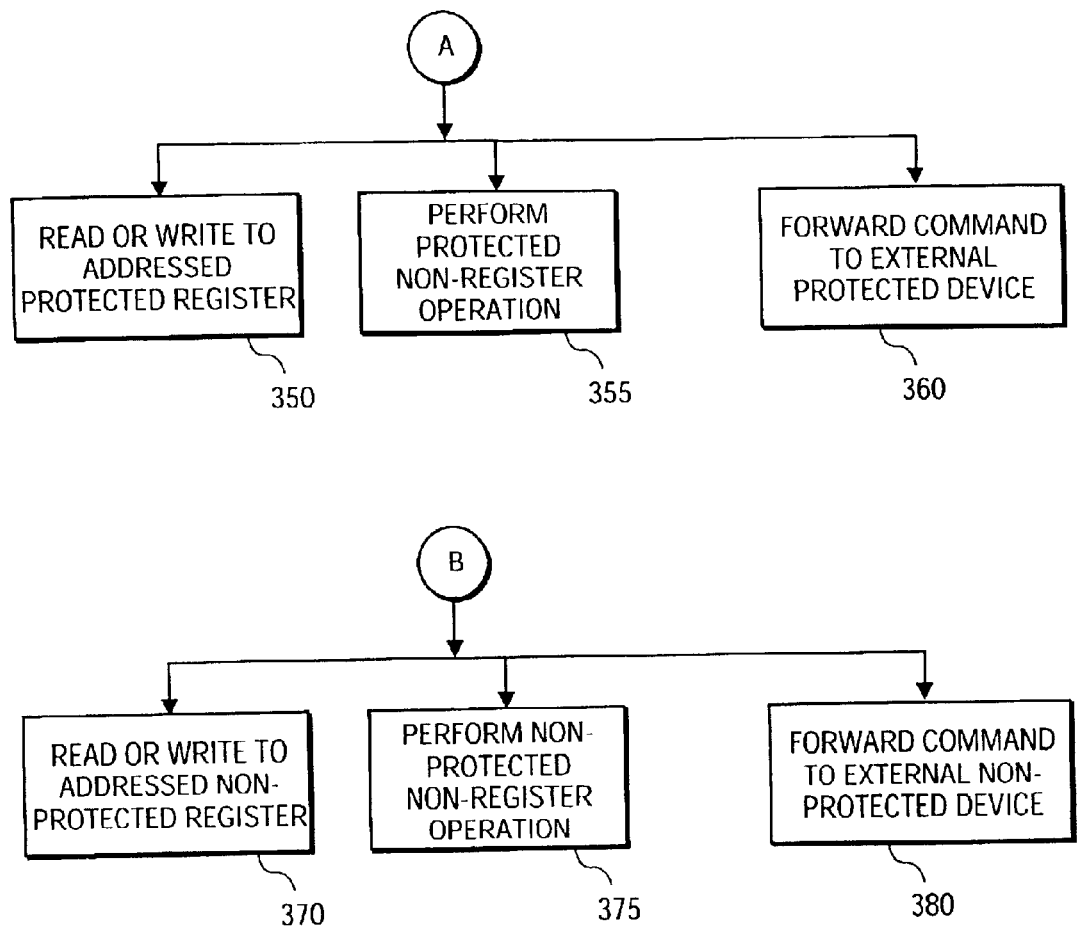

FIGS. 3A–B show a flow chart of a method, according to one embodiment of the invention. Although the description of flow chart 300 may make reference to portions of FIGS. 1 and 2, it is understood that the various embodiments shown in FIGS. 1, 2, and 3A–B may be implemented independently of each other.

In the illustrated embodiment, a command is issued on a processor bus (e.g., processor bus 130 of FIG. 1) at block 305. This may be any command issued by any device connected to the processor bus that is visible to the logic circuit that performs the remaining operations. After the command is detected by interface logic and the destination address of the command is decoded, it may be determined at block 310 whether the destination address is in a range of addresses designated as the configuration space. If not, processing may proceed at block 315 in a manner labeled in FIG. 3A as "normal processing", which may be any processing not involving the configuration space. Since the procedures that may fall within this label are numerous and may not be directly related to embodiments of the invention, they are not described herein.

If it is determined at block 310 that the command has a destination address that is within the configuration space, the command is redirected at block 320 to configuration logic for further processing. In the embodiment of FIG. 1, the command may be further processed within logic circuit 120. At block 325 it may be further determined whether the command was issued by a processor (e.g., one of processors 110 in FIG. 1). Various methods may be used to determine whether the command was issued by a processor (e.g., an indicator in the command, a source address identifying a processor, different formats for processor and non-processor commands, etc.) In one embodiment, accesses to configuration space are only permitted by a processor, while attempted accesses by other devices (e.g., non-processor devices) are not permitted and may result in an abort procedure being implemented at block 330. The abort procedure may include one or more of, but is not limited to: 1) not completing execution of the command, 2) generating an error code over the processor bus, 3) generating a system error message, 4) exiting the protected operational mode, and 5) performing a system reset. In an alternate embodiment (not shown), selected non-processor devices may also be allowed to issue a command to configuration space.

In some embodiments, configuration space is divided into protected configuration space (for monitoring/controlling a protected operating environment) and non-protected configuration space (for monitoring/controlling a non-protected operating environment). In a particular embodiment, both environments may operate concurrently, but processing within them is kept separate. Therefore, if the command is from a legitimate source such as a processor, it may be determined at block 335 whether the destination address of the command is within a range of addresses predefined as the protected configuration space. If not, the command is determined to be directed to non-protected configuration space, and processing continues in FIG. 3B at point "B" of the flow chart. If the address is within protected configuration space, it is determined at block 340 whether the command is a protected command. If a non-protected command is directed to protected configuration space, an error or deliberate security violation may be occurring, and an abort procedure may be implemented at block 345. The abort procedure may include any of the options previously described for block 330, or other procedures not described. The abort procedure implemented for block 345 in a specific instance may be the same or a different abort procedure than used at block 330 in a specific instance.

Protected commands may be distinguished from non-protected commands in various ways. For example, 1) one or more control lines on the processor bus may be used to indicate whether the command is a protected command, 2) the data field may contain one or more bits indicating whether the command is a protected command, 3) the address itself may be sufficient to indicate whether the command is a protected command, 4) the timing of one or more lines may be different for a protected command than a non-protected command, 5) the sequence of various signals on the bus may be different for a protected command than a non-protected command.

If the command is determined to be a protected command, processing may continue in FIG. 3B at point "A" of the flow chart. FIG. 3B illustrates the execution of commands that have passed the preliminary tests of FIG. 3A and are therefore eligible for execution. In one embodiment, commands may be executed in one of three different ways, depending on the requirements of the particular command.

Beginning at point "A", a protected command that is formatted to write data to a protected configuration register or read data from that register, is executed at block 350. The specific destination address in the command may be used to select the particular register. For some commands, a read or write that spans multiple registers may be implemented with a single command, and the destination address may specify the base register, with a field in the command to indicate how many consecutive registers to read or write.

A command to protected configuration space may trigger a protected operation in the configuration logic circuit that does not involve a protected configuration register. For example, a command may set or clear a hardware flag, initiate a microcode sequence, or cause some other event to happen. These commands are executed at block 355. The address of the command may determine the action to take, while other fields within the command may indicate the specific parameters that are needed.

A third type of command may be executed at block 360. Some commands may be destined for a protected device external to the protected configuration logic. These commands may be passed on to the external device, either unchanged or reformatted to accommodate the characteristics of the external device or any intervening hardware. In the embodiment shown in FIG. 1, a command issued by a processor 110 and received by logic circuit 120 may be passed on to token 170 over bus 180. In a particular embodiment, the command may be reformatted by logic circuit 120 to accommodate the characteristics of bus 180 and token 170.

Beginning with point "B" of FIG. 3B, the execution of non-protected commands is shown. Blocks 370, 375, and 380 are the equivalent of blocks 350, 355, and 360, respectively, except that they deal with non-protected commands instead of protected commands. In the embodiments shown in FIG. 3B, the three categories of commands and their implementation are otherwise the same for both protected and non-protected commands. In other embodiments, the non-protected commands may have more or fewer categories, different categories, and/or may be different than the protected commands in other ways.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. A system, comprising:

at least one processor;

a memory; and a logic circuit having a set of registers and coupled to the at least one processor by a first bus and coupled to the memory by a second bus, the logic circuit to map an address within a predetermined range of addresses to a particular register in the set of registers in response to a command with the address being issued by the at least one processor, and to reject the command without mapping in response to the command being issued by a non-processor device, and wherein:

the logic circuit includes a first mode to accept protected commands and a second mode to accept at least one non-protected command, wherein the logic circuit includes control logic to execute a first command to write to the particular register, a second command to read from the particular register, a third command to perform an action in the logic circuit excluding a write to the set of registers and excluding a read to the set of registers, and a fourth command to be conveyed to a protected device external to the logic circuit, the processor includes first microcode to issue a first protected command to switch the logic circuit from the first mode to the second mode, and the processor includes second microcode to issue a second protected command to switch the logic circuit from the second mode to the first mode.

2. The system of claim 1, wherein:

the at least one processor includes an instruction to place on the bus the command with an indicator to indicate the command is a protected command.

3. The system of claim 2, wherein:

the indicator to indicate the command is authorized to access the predetermined range of memory addresses.

4. The system of claim 1, wherein:

the first microcode and the second microcode are executable only in response to execution of protected software instructions.

5. A machine-readable medium that provides instructions, which when executed by a computing device, cause said computing device to perform operations comprising:

issuing a first protected command to render a protected configuration space accessible to a non-protected write command;

writing first data with the non-protected write command to a protected register in a set of protected registers addressable through the protected configuration space;

issuing a second protected command to render the protected configuration space inaccessible to the non-protected write command; and issuing a third protected command addressed to an address within the protected configuration space to perform an action excluding access to the set of protected registers.

6. The medium of claim 5, further comprising:

writing second data to the protected register with a third protected command.

7. A machine-readable medium that provides instructions, which when executed by a computing device, cause said computing device to perform operations comprising:

issuing a first protected command to render a protected configuration space accessible to a non-protected write command;

writing first data with the non-protected write command to a protected register in a set of protected registers addressable through the protected configuration space;

issuing a second protected command to render the protected configuration space inaccessible to the non-protected write command; and issuing a third protected command addressed to an address within the protected configuration space to access a token.

* * * * *